United States Patent

[11] 3,599,628

| [72] | Inventors | Thomas J. Abbenante<br>Branford;<br>Victor H. Giesler, Wallingford; Robert E. Montgomery, Northford; Gerhard T. Weiss, Northford, all of, Conn. |
|---|---|---|
| [21] | Appl. No. | 726,428 |
| [22] | Filed | May 3, 1968 |
| [45] | Patented | Aug. 17, 1971 |
| [73] | Assignee | Corometrics Medical Systems, Inc.<br>North Haven, Conn. |

[54] FETAL HEART RATE AND INTRA-UTERINE PRESSURE MONITOR SYSTEM
31 Claims, 11 Drawing Figs.

[52] U.S. Cl. ................................................. 128/2.06 F,
128/2 R
[51] Int. Cl. .................................................. A61b 5/04
[50] Field of Search ........................................... 324/78;
128/2, 2.05 M, 2.05 P, 2.05 R, 2.05 T, 2.06;
307/233, 295, 220

[56] References Cited
UNITED STATES PATENTS

| 3,229,685 | 1/1966 | Ringkamp et al. | 128/2.05 |
| 1,816,465 | 7/1931 | Boas et al. | 128/2.06 |
| 2,492,617 | 12/1949 | Boland et al. | 128/2.06 |
| 2,927,573 | 3/1960 | Roepke et al. | 128/2.05 |
| 3,287,655 | 11/1966 | Venn et al. | 307/220 X |
| 3,384,075 | 5/1968 | Mitchell | 128/2.06 |

*Primary Examiner*—William E. Kamm
*Attorney*—Delio and Montgomery

ABSTRACT: This disclosure relates to a device for monitoring fetal heart beat and intrauterine pressure and correlating the same to determine fetal distress.

The fetal heart rate monitor employs a photoelectric AGC circuit, a frequency selector producing a ringing output at the dominant frequency of the fetal EKG complex, digital counters to measure the interval between successive heart beats, a digital-to-analog converter and a two-channel recorder.

The intrauterine pressure monitor features a liquid-filled tube connected to a bridge-type pressure transducer, an oscillator for supplying power to the bridge, a differential amplifier for sensing bridge unbalance and a rectifier connected to the amplifier, gated by a pulse from the oscillator and producing a voltage to be recorded on the second channel of the recorder.

INVENTORS
Thomas J. Abbenante
Victor H. Giesler
Robert E. Montgomery
Gerhard T. Weiss BY Dealio and Montgomery
ATTORNEYS

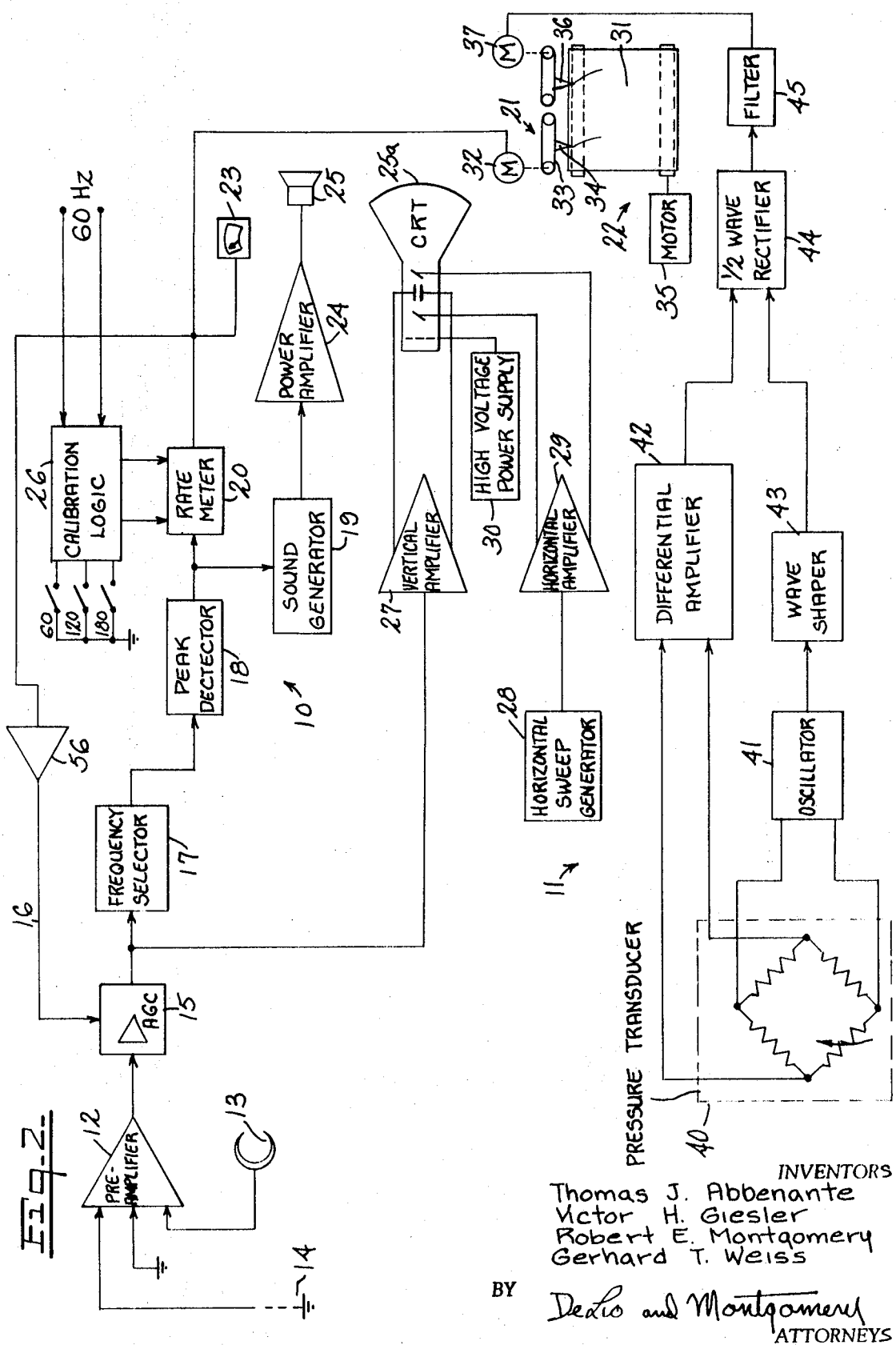

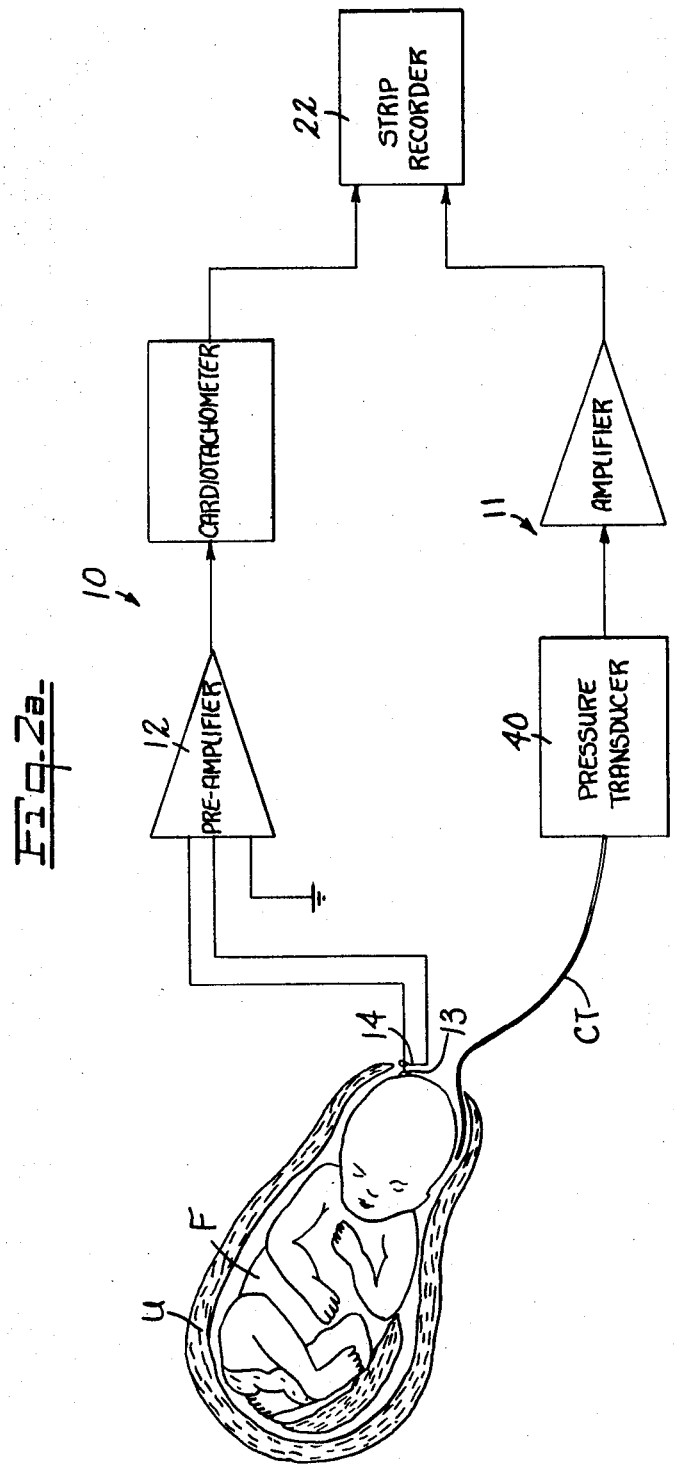

INVENTORS
Thomas J. Abbenante
Victor H. Giesler
Robert E. Montgomery
Gerhard T. Weiss
BY
De Lio and Montgomery
ATTORNEYS INVENTORS
Thomas J. Abbenante
Victor H. Giesler
Robert E. Montgomery
Gerhard T. Weiss BY DeLio and Montgomery
ATTORNEYS

FETAL HEART RATE AND INTRA-UTERINE PRESSURE MONITOR SYSTEM

This invention relates to a system for determining fetal distress and more particularly relates to a system for determining fetal heart rate as a function of intrauterine pressure.

In the cases of women in labor, the fetal heart rate, and more particularly deviations from a normal clinical range of 120 to 160 beats per second have been considered indicative of fetal distress. However, the criteria for the fetal distress has not been clearly defined, so that paradoxical clinical situations not infrequently exist. Fetal distress, encountered during labor, is usually of the acute type directly associated with the recurrent stresses applied to the fetus by uterine contractions, or is the result of compression of the umbilical cord. Studies of Dr. Edward H. Hon of the Department of Obstetrics and Gynecology, Yale University School of Medicine, have shown that the major obstacles to a clear definition of fetal distress are the lack of precise reference points against which fetal heart rate deviations may be studied. A precise definition of fetal distress is mandatory for the optimum management of the fetus during labor and, in its absence, patients do have to be managed clinically.

The major effect of continuous monitoring of fetal heart rate in patients in labor has been the reduction of operative interference during labor and a lower percentage of depressed babies. In practice, every attempt is made to convert an abnormal fetal heart rate pattern to a normal one. When the fetal heart rate pattern is normal, the neonate is, for all practical purposes, born in good condition.

Dr. Edward H. Hon has shown that the diagnosis of fetal distress can be facilitated by monitoring uterine contractions during labor together with the fetal heart rate pattern immediately following the contraction. The more significant fetal heart rate acceleration and deceleration patterns are closely associated with uterine contractions and are, therefore, quasi-periodic. Transitory periodic fetal heart rate changes are distinguished from transitory base line fetal heart rate changes by the adjectives "early," "late" or "variable" which describes the relationship between the onset of a specific fetal heart rate deceleration pattern and the contracting phase of the associated uterine contraction. During labor, each uterine contraction applies pressure directly to the uterine contents and may as well directly alter the intervillus space blood flow and, also, inadvertently cause umbilical cord compression. In all labors, the first two effects of uterine contractions must be present to some degree, but not necessarily the third. Since during many uterine contractions there are no periodic changes in fetal heart rate, a threshold of some type must be present. The normal fetal heart rate pattern is one, therefore, where only irregularity is present.

The quasi-periodic deceleration patterns are clearly defined and have specific waveforms whose deceleration onsets bear a specific timing relationship to the beginning of the associated contraction. Emphasis is placed on the shape of the waveform of the fetal heart rate deceleration pattern and the relationship between it and the associated intrauterine pressure curve. Each fetal heart rate pattern in many ways represents a response evoked by a repetitive mechanical stimulus being applied to the fetus by reoccurring uterine contractions.

This invention provides a new and improved apparatus for constantly monitoring fetal heart rate and simultaneously monitoring intrauterine pressure to determine the change in fetal heart rate and the relationship thereto of uterine pressure. The invention further provides new and improved means for determining a change in heart rate, and means for indicating a differential interval between heart beats.

An object of this invention is to provide new and improved apparatus for monitoring fetal heart rate patterns and intrauterine contractions.

Another object of this invention is to provide new and improved apparatus for determining heart rate.

Another object of this invention is to provide a new and improved instrument to provide for continuously monitoring fetal heart rate patterns and intrauterine contractions and graphically presenting this information for correlation.

A further object of this invention is to provide new and improved means for determining the time interval and change thereof between heart beats.

The features of the invention which are believed to be novel are set forth with particularity in the claims appended to and forming a part of this specification.

The invention, however, both as to its operation and organization, together with further objects and advantages thereof, may best be appreciated by reference to be following detailed description taken in conjunction with the drawings, in which:

FIGS. 1a, 1b, and 1c are graphical representations of fetal heart rate and intrauterine contractions plotted against time for various stimulus being applied to a fetus by reoccurring uterine contractions.

FIG. 2 is a diagram in block form of a monitoring system embodying the invention.

FIG. 2a is a diagram in block form showing the manner of connecting the system of FIG. 2 to a fetus and uterus.

Figure 1C:
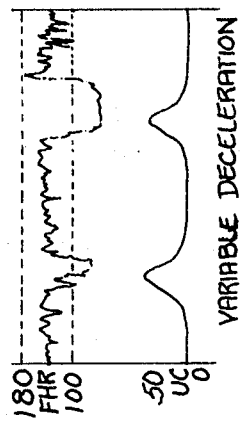
Figure 1B:
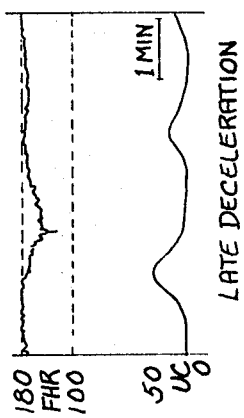
Figure 1A:
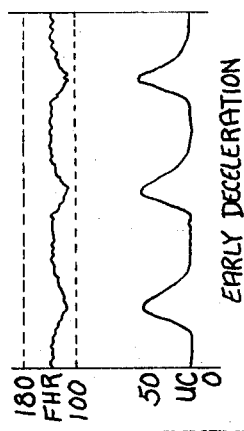

FIG. 1a exemplifies a fetal heart rate (FHR) pattern associated with fetal head compression during uterine contraction (UC). This fetal heart rate deceleration pattern is of uniform shape which reflects the intrauterine pressure curve and has its onset early in the contracting phase of the uterus. The FHR is in beats per minute and the UC is in millimeters of mercury.

FIG. 1b shows a fetal heart rate pattern indicating uteroplacental insufficiency as the result of decreased intervillus space blood flow during uterine contractions. This fetal heart rate deceleration is of uniform shape, which also reflects the intrauterine pressure curve, and has its onset late in the contracting phase of the uterus. A close relationship between each episode of late fetal heart rate deceleration and the concomitant contraction may be noted.

FIG. 1c illustrates a variable fetal heart rate pattern due to umbilical cord compression. This fetal heart rate deceleration pattern is of variable shape, does not reflect the intrauterine pressure curve and its onset bears a variable time relationship to the beginning of the associated contraction.

FIGS. 1a, 1b and 1c exemplify the three major types of fetal heart rate deceleration patterns based primarily on their waveform and, secondarily, on their timing relationship to uterine contractions as follows:

a. Early deceleration, thought to be due to fetal head compression.

b. Late deceleration, thought to be due to uteroplacental insufficiency.

c. Variable deceleration, thought to be due to umbilical cord compression.

On the basis of clinical evaluation by Dr. Edward H. Hon of the neonate immediately after birth, there appears to be a good correlation between specific types of fetal heart rate patterns, fetal biochemical changes and neonatal condition. At the present time, the early deceleration pattern of head compression appears to be innocuous. Warning signals which indicate the need for close watching of the patient are variable deceleration patterns indicating mild umbilical cord compression and tachycardia of 160 beats per minute or greater. The kinds of fetal distress which are ominous are of two types:

1. Variable deceleration patterns lasting more than 1 minute and dropping to 60 beats per minute or less and getting progressively worse, and
2. Late deceleration patterns of any magnitude with or without tachycardia. The presence of tachycardia, especially if it is associated with a very smooth base line of fetal heart rate makes the situation more serious.

As a result of the correlation between fetal heart rate and intrauterine contractions, the position of the patient may be altered in an attempt to redistribute the mechanical forces of a contraction in such a manner as to relieve umbilical cord compression, if present. It has been found that the majority of variable deceleration patterns can be alleviated by repositioning. If late deceleration patterns are present, which are due to supine hypotension, repositioning will also be of benefit since movement of the patient to either side will restore normotension. If the late deceleration patterns are due to uterine hyperactivity, this is usually decreased also by turning the patient from the supine to the lateral positions. In some cases, the administration of oxygen with a light face mask is called for. Other measures which may be called for are the preparation for operative interference and the correction of factors which may contribute to decreased intervillus space blood flow, viz, lower the frequency and amplitude of contractions, if oxytocics are being used for induction; correct maternal hypotension by postero positional changes and/or elevation of the patients legs and administer fluids. If after the above measures have been taken and an ominous fetal heart rate pattern still persists for thirty minutes after the above measures, labor should be terminated operatively.

To enable the physicians to determine data on fetal heart rate patterns and intrauterine contractions, we have provided a new and improved system which is exemplified in the system of FIG. 2. The system of FIG. 2 may be considered in two parts, a fetal heart rate monitoring system 10 and an intrauterine pressure measuring system 11. The system 10 comprises a preamplifier 12 which receives inputs from a probe 13, which picks up the heart beat of the fetus. The probe 13 is attached directly to the fetus and the input may be grounded in the placenta as indicated at 14. The heart rate monitoring system 10 subsequent to the preamplifier 12, in essence, comprises a cardiotachometer. The intrauterine pressure measuring system 11 particularly comprises a pressure transducer 40 together with the following amplifying arrangement.

Preamplifier 12 is a high gain, low noise amplifier with a high signal-to-noise ratio as referred to the input. It is selected to have a high input impedance and a high common mode rejection ratio.

The output of preamplifier 12 is applied to an automatic gain control circuit and amplifier 15 which receives as a variable control element an analogue output voltage from line 16. The automatic gain control circuit maintains a constant output of one volt peak. A predetermined amplitude of the EKG. complex as amplified by the automatic gain control circuit is detected as hereinafter described. The output of the automatic gain control circuit is applied to a frequency selector 17 which basically comprises a filter or tuned circuit, tuned to 30 Hz. The main component of a fetal electrocardiac complex is 30 cycles and the application of this complex rings the tuned circuit in the frequency selector and provides a ringing input waveform to peak detector 18. Peak detector 18 includes a pulse generator as hereinafter described which detects the peaks of the input wave form and generates a pulse train in response thereto. The pulse output of the peak detector and pulse generator is applied to an audio frequency sound generator 19 and also a digital-to-analogue rate meter 20. Rate meter 20 provides an analogue output voltage proportional to fetal heart rate (FHR) which is applied to a first pen or stylus control 21 of a strip recorder 22. The output may also be applied to an indicating type rate meter 23. The output of the audiosound generator 19 may be applied to a power amplifier 24 and subsequently to a mechanical transducer or speaker 25.

Network 10 also includes a calibration logic circuit 26 which receives a line frequency of, say, 60 cycles which may be suitably divided and applied to rate meter 20 for calibration purposes, as hereinafter described. When an input is applied to rate meter 20 from calibration logic 26, the input to meter 20 from peak detector and pulse generator 15 is blocked. For instant viewing of the EKG. complex of the fetus, the output of AGC circuit 15 may be applied to the vertical deflection plates of a cathode-ray tube 25a through a vertical deflection amplifier 27. The cathode-ray tube has the usual associated horizontal sweep generator 28, horizontal amplifier 29 and a high voltage power supply 30.

The fetal heart rate system 10 provides continuous monitoring of the fetal heart rate pattern on the chart 31 of strip recorder 22. Strip recorder 22 is of the type which includes a stylus control or motor 32 which moves a hand 33 carrying a stylus 34 in response to the magnitude of the voltage input thereto. The strip recorder 22 is driven at a predetermined rate by a drive motor 35. A second stylus 36 is similarly driven by a motor 37 which is responsive to the output of network 11. FIG. 2a shows the system of FIG. 2 in a more general block diagram form connected to a fetus F in a uterus U. The pressure transducer 40 is liquid coupled to the interior of the uterus U by a catheter CT inserted into the uterus. As previously pointed out, the electrode 13 is coupled to the fetus F while the lead 14 is grounded in the liquid in the placenta.

Thus, pressure changes exerted on the liquid in the uterus are transmitted via the catheter to the transducer. A suitable transducer is a Model P23DB strain gage of Statham Laboratories, Inc. of Hato Rey, P.R. which uses piezoelectric elements.

This transducer 40 is of the bridge type having a pressure-sensitive element in one of its arms. This bridge is excited by oscillator 41 and the output of the bridge is applied to a differential amplifier 42 which detects the degree of unbalance of the bridge. The sinusoidal waveform of the oscillator is also applied to a wave shaper 43 which converts the sinusoidal input to a rectangular wave. The output of the wave shape is in phase with the output of the bridge. The shaped rectangular wave, during one-half its cycle, acts to gate half-wave rectifier 44. The output of rectifier 44 is applied to a filter and, hence, utilized to drive stylus 36 to record uterine contractions (UC).

Figure 3:
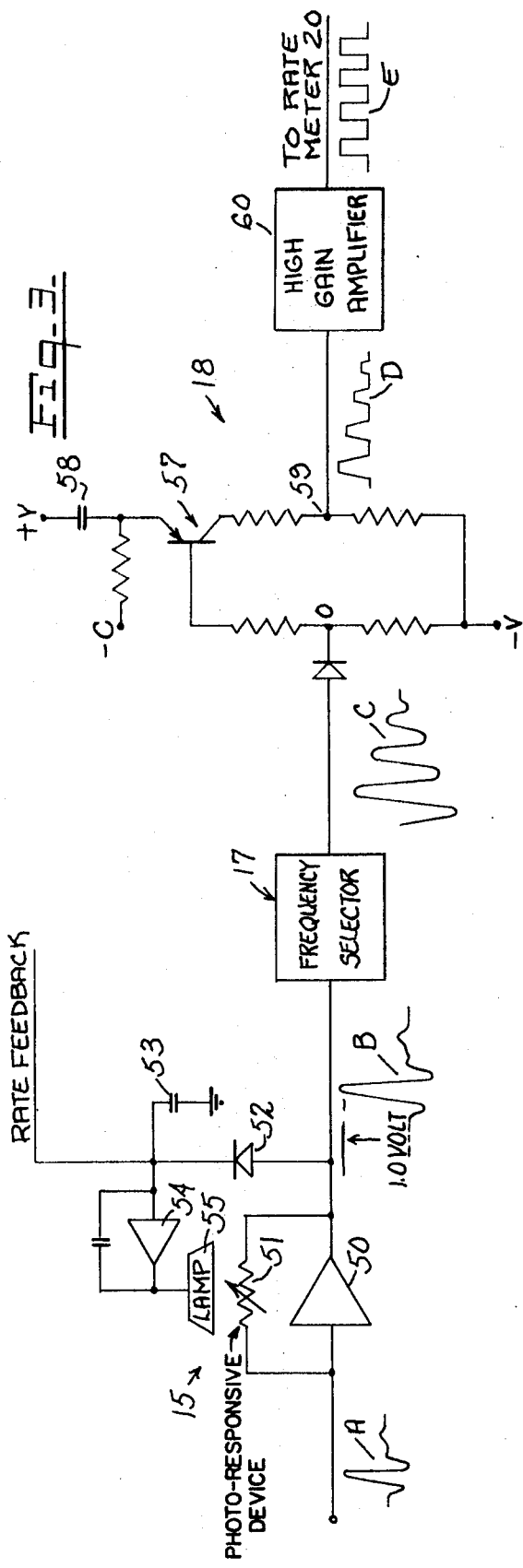
FIG. 3 is a diagram primarily schematic and partly in block form showing elements of the system of FIG. 2.

Elements of the rate network 10 of FIG. 1 are shown in more detail in FIG. 3. The AGC circuit 15 receives an EKG. complex A from preamplifier 12. One important function of AGC circuit 15 is to insure that the output voltage therefrom has a peak magnitude of a predetermined voltage, for example, 1 volt. The AGC network includes an amplifier 50 with a photosensitive resistor 51 in a feedback circuit. The output voltage from amplifier 50 is further rectified by a diode 52 and charges a capacitor 53. It will be apparent that the magnitude of the rectified voltage will depend on the FHR, and the rectified voltage. Capacitor 53 controls the input to a lamp driving amplifier 54. The magnitude of the output of driver 54 controls the intensity of the light from a light source or lamp 55 incident upon photoresistor 51, thereby controlling the resistance in the feedback circuit and amplifier and the gain thereof. An additional feedback signal is applied over line 16 from rate meter 20 through an inverter 56 (FIG. 2). The purpose of this feedback signal is to complement the rectified signal through diode 52. For example, if the FHR is low, the voltage across capacitor 53 will build up at a slower rate resulting in a decreased voltage input to driver 54. To compensate for this the rate feedback voltage, which is low at a low FHR, is inverted and also utilized to charge capacitor 53. In this manner, the peak voltage of waveform B from AGC circuit is maintained at 1 volt. The importance of this will become more apparent in conjunction with the discussion of the calibration logic. Waveform B which is an EKG. complex, is in essence a replica of waveform A which is the detected EKG. complex. The waveform B is applied to a frequency selector 17 which preferably takes the form of a tuned circuit which, in this application, is tuned to 30 Hz., the predominant frequency component of the fetal EKG. complex. The frequency selector 17 provides a ringing waveform C which is peak detected and shaped by a peak detector 18 which operates as follows:

Transistor 57 is normally back-biased and turned off. However, as the waveform C is applied thereto and on the negative half cycles thereof, transistor 57 is forward-biased and commences to conduct, and capacitor 58 discharges therethrough until the direction of the voltage in the input waveform changes, at which time transistor 57 commences to turn off. The resulting voltage of voltage divider 59 is shown as waveform D and comprises pulses of decreasing amplitude corresponding to the negative half-waves of ringing signal C. Waveform D is applied to a high gain amplifier 60 which shapes the trapezoidal waveform D into a rectangular waveform E. The leading edge of the pulses of rectangular waveform E then represents the negative peaks of the ringing wave C.

Figure 4:
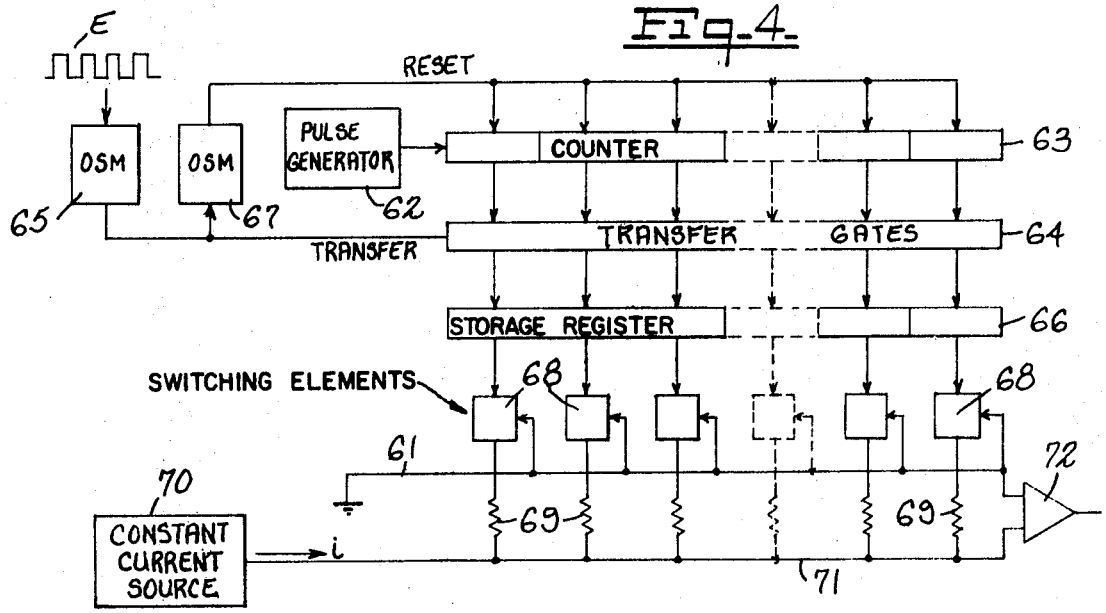
FIG. 4 is a schematic diagram of the rate network of FIG. 2.

The rate meter 20 is based on digital principles and computes and indicates pulse rates instantaneously after the termination of the time interval between two pulses and presents the result in the form of a voltage which is proportional to the computed rate. This voltage persists without decay until a new time interval has elapsed, and if there is a change in rate upon detection of the new time interval, the new rate will be indicated immediately and without delay, since no filtering or integrating network is required. Each interval is evaluated and there is no need to skip one interval to perform computations. In rate meter 20 (FIG. 4) a pulse generator 62 applies pulses at a constant frequency to a binary counter 63 which may be composed of a plurality of binary counting elements, such as flip-flops. Counter 63 will continue counting the pulses from pulse generator 62 until reset. The contents of each stage of counter 63 is sensed by one of a plurality of gates 64. The pulse waveform D from peak detector 18 may be initially applied to pulse shaper in the form of a one-shot multivibrator (OSM). OSM 65 is fired in response to the leading edge of the first pulse of waveform D, and has a period sufficiently long to ignore the later pulses of waveform D. The output of OSM 65 provides a "transfer" pulse to gates 64, to open the gates and copy the contents of counter 63 into a storage register 66. The output of OSM 65 is also applied to a delay network in the form of another OSM 67 which generates a reset pulse for the flip-flops of counter 63. The reset pulse resets these flip-flops to their zero state after the contents of counter 63 have been transferred to register 66. Register 66 may comprise a plurality of bistable devices which are set or reset depending upon the binary content of an associated bit of counter 63 when gates 64 are opened. OSM 65 may also be utilized to inhibit pulse generator 62 upon occurrence of the transfer pulse for a period extending to resetting of the elements of counter 63 by OSM 67.

The storage elements in register 66 each operate a switching element 68. If the storage elements hold a binary "one" the corresponding switching elements provide a circuit path through corresponding resistances 69 for current flow from a constant current source 70 to ground over line 61.

The resistances 69 have values in binary relation, and the voltage drop, if any, across each individual resistor considered by itself will represent the binary weight of an associated bit in register 66. The total voltage drop across parallel resistances 69 therefore is inversely proportional to the numerical content of register 66. Thus, the voltage across lines 61 and 71 is the reciprocal of time and, hence is proportional to rate. The voltage across lines 61 and 71 may be applied to an amplifier 72 and, hence, to recorder 22.

This provides a rate voltage which indicates the instantaneous heart rate.

The frequency of pulse generator 62 is selected to be very much greater than any frequency of the heart beat of the fetus which normally will not go above 180 Hz.

Figure 5:
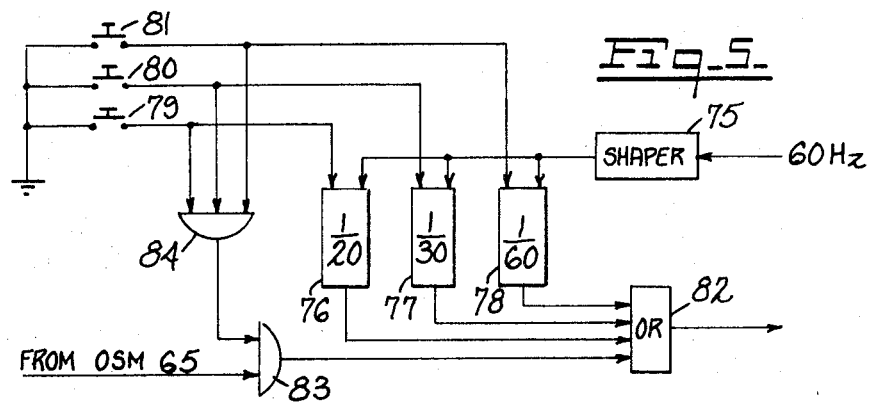
FIG. 5 is a logic diagram of a calibration system used in the system of FIG. 2.

The calibration network 26 is exemplified in FIG. 5. A 60 Hz. wave is applied to a pulse shaper 75 which converts half of the 60 Hz. to a square wave. The output is then applied to multipliers, and perhaps more appropriately named pulse dividers 76, 77 and 78 which, when gated by the closing of one of selector switches 79, 80 or 81, respectively, allows the 60 Hz. square wave to be divided by an appropriate factor to give a calibration pulse train of 60, 120 or 180 pulses per minute. The outputs of the dividers 76, 77 and 78 are applied to an OR gate 82 which also receives an input from a coincidence gate 83. Coincidence gate 83 will pass the pulses of one-shot multivibrator 65 (FIG. 5) when gate 84 senses that none of the calibration switches 79, 80 or 81 have been closed.

In this manner, the user of network 26 may cause a stylus to trace a calibration line on the strip so that the user may determine the numerical range of the fetal heart rate. This, together with the automatic gain control network 15, permits a temperature independent, high degree of accuracy, and eliminates the necessity for any manual gain control for the CRT or rate computation.

In some instances, direct information regarding the intervals between heart beats may be desirable. Such information would be used not only with fetuses, but in other applications, as well.

Figure 7:
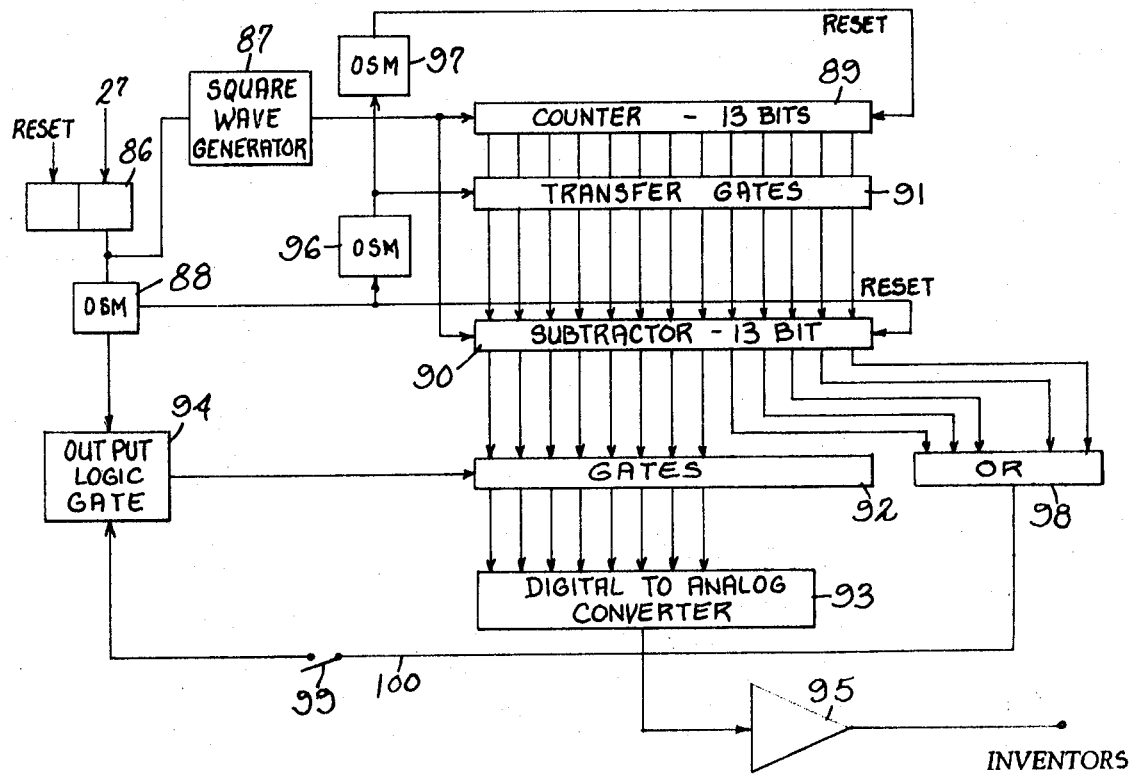
FIG. 7 is a diagram in block form of a system for detecting the differential interval between heart beats.
Figure 6:
FIG. 6 is a graphical representation of waveforms representing differential intervals between heart beats.

Reference is now made to FIG. 6 which exemplifies a waveform diagram which represents in magnitude the difference in interval between successive heart beats, and in voltage direction, the direction of interval changes that is, either an increase in the interval or a decrease in the interval. A network for determining this information is shown in FIG. 7. In the differential interval monitor of FIG. 7, the reset pulse from OSM 67 (FIG. 4) is applied to a flip-flop 86. This occurs at the onset of a fetal heart beat. This input pulse as shown in FIG. 8a resets flip-flop 86 which, in turn, inhibits the output of square wave generator 87.

Figure 8:
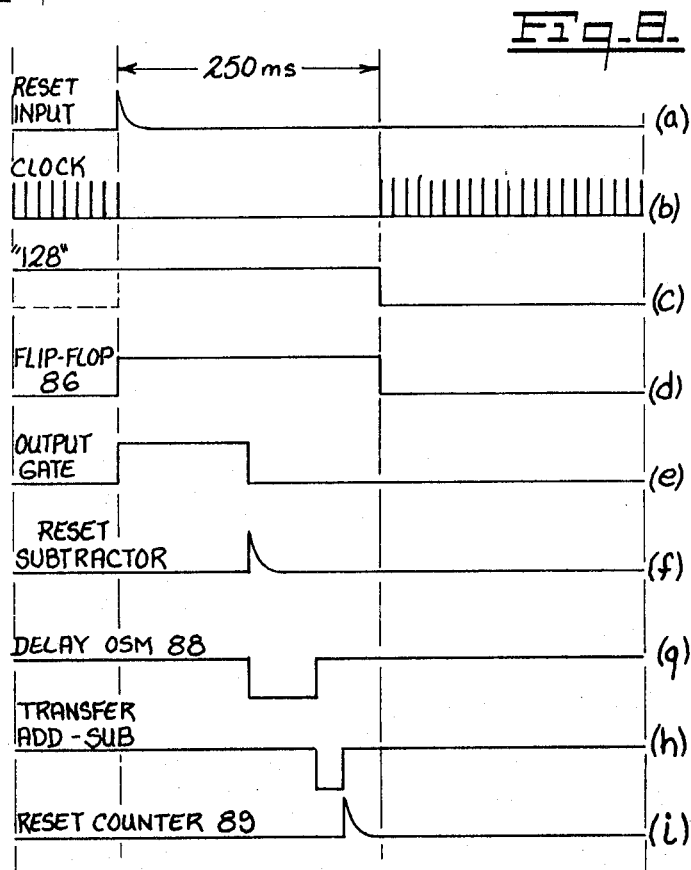
FIGS. 8a—8i graphically illustrates the time relation of waveforms occurring in the system of FIG. 7.

The output of wave generator 87 is applied simultaneously to a counter which counts the number of pulses applied thereto between reset inputs to flip-flop 86, and to a subtractor 90 to subtract the number of pulses of square wave generator 87 from the number in subtractor 90. Subsequently, the resultant subtraction is transferred through gates 91 and 92, when opened, to a digital-to-analogue converter 93 and, hence, the converted analogue voltages applied to an amplifier 95 and to any suitable readout or recording device such as those exemplified in FIG. 2 and also magnetic tape. In this manner, a voltage or display is generated which represents the time interval between successive heart beats. With reference to FIG. 8, at the occurrence of a reset pulse from OSM 67 (FIG. 8a) which occurs a predetermined time after a heart beat, flip-flop 86 is set and inhibits square wave generator 87 (FIG. 8b) until counter 63 (FIG. 4) registers a one bit in its $2^7$ (FIG. 8c) stage. This resets flip-flop 86 (FIG. 8d) and gates square wave generator 87 (FIG. 8e) and the count in counter 89 commences. When flip-flop 86 is set, it triggers one-shot multivibrator 88 which simultaneously opens output logic gate 94 for the period of the OSM, and at the end of the OSM 88 period (FIG. 8f) resets subtractor 90. When OSM 88 times out, it triggers OSM 96 (FIG. 8g) which opens gates 91 and transfers the contents of counter 89 to subtractor 90 (FIG. 8h). When OSM 96 times out, it fires another OSM 97 (FIG. 8h) which resets counter 89. At this point, the previous count from counter 89 has been copied into subtractor 90. This represents a time interval between heart beats. Subsequently, the next period of operation of square wave generator 87 will represent the new time between heart beats which will be subtracted from the count in subtractor 90. This digital information will be converted to an analogue voltage when gates 92 are opened by output logic gate 94 at the time shown in FIG. 8e.

Additional logic is provided to insure that no invalid information on change of rate is indicated or displayed. If the counter or subtractor is of 13 bits, for all practical purposes, the digital analogue converter would only have to act on the first 8 bits. Invalid information would be signified when the resultant number in subtractor 90 was either too large or too small. If the count is too large, the subtractor will overflow and all stages will reset to a binary "one". If the count is too small, there will be insufficient carries to change the state of the five higher order stages to binary "zeros". To this end an OR gate 98 senses the five higher order stages of subtractor 90. If any of the five highest order stages contains a binary "one", a logically invalid condition exists and the output of OR gate 98 disables output gate 94. If desired, a switch 99 may be provided in line 100 to disable this sensing logic.

From the foregoing it may be seen that the objects of the invention set forth as well as those made apparent are efficiently attained. While preferred embodiments of the invention have been set forth for purposes of disclosure other embodiments of the invention as well as modifications to the disclosed embodiment which do not depart from the scope of the invention may occur to others skilled in the art. Accordingly, the appended claims are intended to cover all embodiments and modifications of the invention which do not depart from the spirit and scope thereof.

What we claim is:

1. A system for monitoring heart rate comprising means for detecting the electrocardiograph complex of a subject, amplifying means for controlling the amplitude of the detected complex to an essentially constant value, means responsive to said amplifying means for detecting a predetermined amplitude of each complex, means for measuring the time interval between each detected predetermined complex amplitude, means responsive to said time interval measuring means for indicating the rate of successive heart beats and further means responsive to said time interval measuring means for indicating differentials in the intervals between successive heart beats.

2. A system for monitoring the condition of a fetus in the uterus comprising means for detecting the electrocardiograph complex of a fetus, means for controlling the amplitude of the detected complex to an essentially constant value means for detecting the peak of each complex, means for measuring the time interval between each complex peak, means responsive to said measuring means for indicating the rate of successive heart beats, means for monitoring intrauterine pressure, and means for recording the fetal heart rate and intrauterine pressure simultaneously with respect to a common time base.

3. The system of claim 2 wherein said means for recording comprises a strip recorder having a stylus for recording each of the heart rate and compression, and means for calibrating the heart rate stylus at a plurality of rates.

4. A system for monitoring heart rate comprising means derived signals inductive of the heartbeat of a subject, means for amplifying the detected complexes to an essentially constant value, means responsive to said amplifying means for detecting a predetermined amplitude of each derived signal, a counting device for counting a plurality of pulses, a pulse generator, means for applying the pulses of said pulse generator to said counting device between the detected predetermined amplitudes the derived signals to derive a numerical count proportional to the time between successive derived signal and means for deriving a signal proportional to the number of pulses counted by said counting means between successive derived signals.

5. The system of claim 4 further including numerical storage means, means responsive to receipt of a signal indicator of a derived signal for storing the numerical content of said counter in said storage means and resetting said counting device for another count, said means for deriving a signal proportional to the number of pulses being responsive to the count in said storage means to provide a signal inversely proportional in magnitude to the stored numerical count.

6. The system of claim 5 further including means responsive to the resetting of said counting device for indicating the difference in time between derived signals.

7. The system of claim 4 wherein said amplifying means includes automatic gain control means for amplifying the derived signals to an essentially constant value, and means for detecting a predetermined amplitude of each amplified complex, the pulses of said pulse generator being applied to said counting device between detections of said predetermined amplitude of successive derived signals.

8. A system for detecting the difference in time interval between successive heart beats of a subject comprising means for detecting the electrocardiograph complex of the subject, means responsive to detection of the complex for establishing a numerical representation of the time between detection of a first and a second complex, means for storing said representation and subtracting therefrom a numerical representation of the time between said second and a third complex to derive a numerical representation of the time difference in the interval between said first and second signals and said second and third signals, and means for indicating said time difference between successive signals.

9. An instrument for monitoring the condition of a fetus in the uterus, comprising means for detecting the heart beat of the fetus, counting means for measuring the time interval between successive heart beats and establishing a numerical representation of the time interval between successive heart beats, means for measuring the intrauterine pressure, means responsive to said numerical representation for providing a signal indicative of fetal heart rate, means responsive to said measuring means for deriving a signal indicative of intrauterine pressure, and means for simultaneously displaying a representation of the derived signals in timed relation.

10. The system of claim 9 wherein said means for displaying is a strip recorder.

11. The system of claim 9 wherein said detecting means includes an electrode connectable to the fetus and said means for measuring comprises a pressure-sensitive transducer and a catheter for liquid-coupling said transducer to the uterus.

12. The system of claim 9 further including means for displaying EKG. complex of the detected heart beat.

13. The system of claim 9 further including means for providing a heart rate calibration frequency, and means for causing said display means to indicate the calibration frequency.

14. A system for monitoring the condition of a fetus in the uterus, comprising means for detecting from the fetus its electrocardiograph complex, means responsive to said detection means for measuring the time interval between each complex and deriving a signal indicating the fetal heart rate, means for monitoring the intrauterine pressure and deriving a signal indicative thereof, display means, and means for applying the rate signal and the pressure signal to said display means to simultaneously display indications of the heart rate and pressure with respect to a common time base.

15. The system of claim 14 wherein said detecting means includes electrode means directly connectable to the fetus.

16. The system of claim 14 wherein said means for monitoring comprises a pressure transducer adapted to yield an electrical signal responsive to fluid pressure applied thereto and catheter means for liquid coupling said transducer to the uterus.

17. The system of claim 14 wherein said means for deriving a rate signal comprises amplifying means for amplifying each detected electrocardiograph complex to an essentially constant amplitude, means for detecting a predetermined magnitude of each amplified complex, means for detecting the time interval between the detected predetermined magnitude of each complex, and means responsive to said time interval detecting means for providing a signal indicative of heart rate.

18. The system of claim 17 further comprising means for controlling the gain of said amplifying means as a function of said heart rate signal.

19. The system of claim 17 further including a frequency selector coupled to said amplifying means for selecting the predominant frequency wave of the complex, said predetermined amplitude detecting means being coupled to receive the output of said frequency selector.

20. The system of claim 20 further including a gain control circuit for said amplifying means comprising means for controlling the gain of said amplifying means in one direction as a function of the amplitude of the complex and in the opposite direction as a function of the rate indicative signal.

21. The system of claim 14 wherein said display means comprises a strip recorder having first and second stylii, and means for producing movement of said stylii in accordance with the amplitude of said rate and pressure signals.

22. The system of claim 20 wherein said peak detecting means comprise a tuned circuit ringing at the predominant frequency of the complex and providing a sinusoidal ringing signal in response to each complex, and means for detecting the change in direction of the waveform of the ringing signal to detect the peak thereof.

23. A system for monitoring the heart rate of a subject, comprising means for detecting the electrocardiograph complex of the subject, means for amplifying the detected complexes to an essentially constant amplitude, means for detecting a predetermined amplitude of each amplified complex, means for measuring the time interval between the detected predetermined amplitude of each complex, and means responsive to said means for measuring for providing a signal indicating the rate of occurrence of the complexes, said means for amplifying including gain control means operative as a function of amplitude of the detected signals and the rate signal to maintain the output signal at an essentially constant predetermined amplitude.

24. The system of claim 23 wherein said time interval measuring means comprises pulse counting means, a source of repetitively reoccurring pulses, means for applying the pulses from said source to said counting means to count the number of pulses occurring between detected predetermined amplitudes of successive complexes.

25. The system of claim 24 further including means for indicating the differential interval between successive complexes.

26. The system of claim 23 wherein said amplifying means includes a feedback circuit from the output thereof to the input thereof, a capacitor coupled to said feedback circuit and arranged to be charged by the output signal at said amplifier, means coupling an inversion of the rate signal to said capacitor, the charge on said capacitor controlling the gain of said amplifying means.

27. The system of claim 26 wherein said feedback circuit includes a photosensitive resistance, a lamp, a driver arranged to illuminate said lamp in response to the charge on said capacitor, the degree of illumination of said lamp controlling the effective resistance value of said photosensitive resistance and hence the magnitude of the feedback signal to the input of said amplifier.

28. An instrument for monitoring the condition of a fetus in the uterus, said instrument comprising means for detecting from the fetus its electrocardiograph complex, amplifying means for amplifying the detected complex to an essentially constant amplitude, means for detecting a predetermined level of each amplified complex, means for detecting the time interval between the detected predetermined levels of each complex, means responsive to said time interval detecting means for providing a signal indicative of heart rate, a pressure transducer adapted to yield an electrical signal responsive to fluid pressure applied thereto means for liquid coupling said transducer to the uterus, a strip recorder having first and second stylii, and means for producing movement of said first and second stylii responsive to the amplitudes of said rate and pressure signals to simultaneously display representations of the heart rate and uterine pressure with respect to a common time base.

29. A system for monitoring the condition of a fetus in the uterus comprising means for detecting the heart beat of the fetus, means for monitoring the intrauterine pressure, a pulse generator, pulse counting means, means for applying the pulses from said pulse generator to said counting means between successive heart beats, means responsive to the numerical count in said pulse counting means for providing a signal indicative of fetal heart rate, means responsive to said pressure monitoring means for providing a signal indicative of intrauterine pressure, signal responsive display means, and means for applying the rate and pressure indicative signals to said display means to provide a display of indications of heart rate and intrauterine pressure in timed relation.

30. The system of claim 29 further including numerical storage means, means responsive to receipt of a signal indicative of a detected predetermined amplitude for storing the numerical content of said counter in said storage means and resetting said counting device for another count, said means for deriving a signal proportional to the number of pulses being responsive to the count in said storage means to provide a signal inversely proportional in magnitude to the stored numerical count.

31. The system of claim 29 wherein said detecting means includes an electrode connectable to the fetus and said means for monitoring comprises a pressure-sensitive transducer and a catheter for liquid coupling said transducer to the uterus.

PO-1050 (5/69)

UNITED STATES PATENT OFFICE
CERTIFICATE OF CORRECTION

Patent No. 3,599,628      Dated August 17, 1971

Inventor(s) Thomas J. Abbenante et al

It is certified that error appears in the above-identified patent and that said Letters Patent are hereby corrected as shown below:

Column 5, line 34, delete "63" and substitute therefor -- 62 --. Column 7, line 48, after "means" insert -- for --. Line 49, delete "derived" and substitute therefor -- deriving -- Line 49, delete "inductive" and substitute therefor -- indicative --. Line 50, delete "detected complexes" and substitute therefor -- derived signals --. Line 58, delete "signal" (First occurrence) and substitute therefor -- signals Line 62, delete "indicator" and substitute therefor -- indicative --. Column 8, line 36, after "playing" insert -- the Column 9, line 1, delete "20" and substitute therefor -- 17 -- Line 10, delete "20" and substitute therefor -- 17 --.

Signed and sealed this 22nd day of August 1972.

(SEAL)
Attest:

EDWARD M. FLETCHER, JR.
Attesting Officer

ROBERT GOTTSCHALK
Commissioner of Patents